United States Patent
Vega et al.

(10) Patent No.: US 11,326,726 B2
(45) Date of Patent: May 10, 2022

(54) FLUID CONNECTION DEVICE HAVING A SENSOR TO SENSE THAT A MALE NOZZLE IS RECEIVED WITHIN A FEMALE NOZZLE

(71) Applicant: HUTCHINSON, Paris (FR)

(72) Inventors: Jean-Gabriel Vega, Pannes (FR); Thierry Benard, Checy (FR)

(73) Assignee: HUTCHINSON, Paris (FR)

( * ) Notice: Subject to any disclaimer, the term of this patent is extended or adjusted under 35 U.S.C. 154(b) by 421 days.

(21) Appl. No.: 16/414,595

(22) Filed: May 16, 2019

(65) Prior Publication Data
US 2019/0353290 A1   Nov. 21, 2019

(30) Foreign Application Priority Data

May 17, 2018 (FR) ..................................... 1854144

(51) Int. Cl.
*F16L 35/00* (2006.01)
*G01M 15/02* (2006.01)

(52) U.S. Cl.
CPC ........... *F16L 35/005* (2013.01); *G01M 15/02* (2013.01); *F16L 2201/10* (2013.01)

(58) Field of Classification Search
CPC ..... F16L 2201/10; F16L 35/00; F16L 35/005; G01M 15/02
See application file for complete search history.

(56) References Cited

U.S. PATENT DOCUMENTS

2002/0058436 A1    5/2002  Saba
2010/0320755 A1*  12/2010  Williams ............... G01D 21/00
                                                                285/355
2011/0133759 A1*   6/2011  Chamberlin ........... H03K 17/97
                                                                324/682
2016/0169069 A1    6/2016  Weber
2020/0370695 A1*  11/2020  Hall, II ................. H01H 19/04
2021/0025355 A1*   1/2021  Lucka ................ F02M 25/0872

FOREIGN PATENT DOCUMENTS

| CN | 107740893 A | 2/2018 |
| DE | 10 2014 102596 A1 | 6/2015 |
| DE | 10 2016 212118 A1 | 1/2018 |

OTHER PUBLICATIONS

French Search Report dated Jan. 14, 2019, for French Application No. 1854144, filed May 17, 2018, 2 pages.

* cited by examiner

*Primary Examiner* — Eric S. McCall
(74) *Attorney, Agent, or Firm* — Christensen O'Connor Johnson Kindness PLLC

(57) ABSTRACT

Fluid connection device, in particular for a motor vehicle, includes a female nozzle having an internal fluid flow passage, and being configured to receive a male nozzle. A sensor senses that the male nozzle is received within the female nozzle, and an electrical plug electrically connects the sensor to an electrical power source. The sensor includes a flexible, electrically conductive dome located within the female nozzle. In a first position, the dome has a generally curved shape. When the male nozzle is inserted into the female nozzle, the male nozzle presses the dome to deform the dome into a second position. In the second position, the dome has a generally flattened shape and provides an electrical connection between two terminals connected to the electrical.

18 Claims, 5 Drawing Sheets

FLUID CONNECTION DEVICE HAVING A SENSOR TO SENSE THAT A MALE NOZZLE IS RECEIVED WITHIN A FEMALE NOZZLE

TECHNICAL FIELD

This present disclosure is directed to a fluid connection device, in particular for a motor vehicle, that can be used for an application such as the connection of an air intake nozzle to a gas leakage pipe of an internal combustion engine.

BACKGROUND

A gas leakage pipe of an internal combustion engine, for the passage of gases from the combustion chamber to the engine crankcase, is widely known as a "blow-by". In general, motor vehicles' quick connections are used to connect fluid transfer pipes to engine components. In particular, fluid connection and heating devices are used in pollution control systems where the gaseous residues of engine combustion that accumulate in the engine crankcase and contain water in particular are injected into the air intake pipe. In extreme cold, this water can icy up and cause the pipe to clog, which can cause an increase in pressure in the engine crankcase in the event of total clogging, leading to the lubricating oil contained in the engine crankcase being evacuated through the measuring gauge inlets. This can result in significant damage to the engine.

In the current technique, such a connection device includes fluid heating means based on components with a Positive Temperature Coefficient or "PTC". The fluid to be heated circulates in a thermally conductive tube, typically made of aluminum, which is heated by the PTC components. Indeed, a PTC component is relatively small (diameter of about 8 mm), which leads to the use of a conductive tube to artificially increase the exchange surface between the fluid and the heating means. There are several ways to thermally connect a PTC component to the tube, usually by welding or pressing the component against the tube.

Document FR-A1-2 943 718 describes a fluid connection device with PTC components.

Motor vehicle emission control systems are subject to strict regulations (OBD standard, an acronym for On Board Diagnostic) that were initially set up by the CARB (Californian Air Resources Board) to control vehicle pollutant emissions. The arrival of electronic engine management system and associated sensors has enabled vehicles to reduce their pollutant emissions. The OBD, as such, stipulates that the vehicle must, over its entire lifetime, constantly monitor the proper functioning of the engine in terms of pollution. It specifies that emission failures must be reported by an indicator light on the dashboard and that codes corresponding to the detected failures must be recorded by the vehicle. In this context, it is important to ensure that the fluid connection device is properly connected. During a motor maintenance operation requiring the disassembly of the device, it is possible that the device is not properly connected by an operator and this connection defect must be identifiable and correctable.

This disclosed embodiments of a fluid connection device propose an improvement in technology to meet the needs of the regulations in force.

SUMMARY

The present disclosure is directed to a fluid connection device, in particular for a motor vehicle, comprising:

a female nozzle having an internal fluid flow passage, and configured to receive a male nozzle, elastic snap-in means carried by said female nozzle and configured to cooperate with said male nozzle when the latter is engaged in said female nozzle, means for detecting the elastic snap-in of said male nozzle into said female nozzle, and an electrical plug for electrically connecting the device to an electrical power source, characterized in that said detection means comprises a flexible and electrically conductive dome which is housed in said female nozzle and which is elastically deformable from a free position without stress in which it has a generally curved shape, to a position stressed by pressing said male nozzle on a vertex of the dome which then has a generally flattened shape and provides an electrical connection between two terminals connected to said electrical plug.

In current technology, a male nozzle, for example for air intake, includes an outer annular rib for elastic snap-fit cooperation with a female nozzle of a connection device. Embodiments of the disclosed connection device propose to detect this snap-in without modifying the male nozzle, which is economical and therefore advantageous. For this purpose, the embodiments propose that the detection means cooperate directly with the male nozzle and preferably with the cylindrical surface of the male nozzle on which the rib protrudes. This is made possible by dome detection means. This type of dome is known in another very different application, which is a computer keyboard. A flexible and electrically conductive dome is located under each key on the keyboard and can be deformed from a free position to a deformed position by pressing a key, in which the dome provides an electrical connection. A dome is used here in a fluid connection device and has the advantage of being simple to make, space-saving, and less sensitive to dimensional chains. It optimizes the detection of the correct connection of the male nozzle to the female nozzle in a reliable and economical manner.

The device according to the disclosed embodiments thus has a double connection function, fluidic and electrical respectively. The dome preferably has a function of a normally open single-acting electrical switch.

The advantage of the device can be that it allows reliable and permanent diagnosis by a computer of a motor vehicle. On the contrary, a pressure sensor that would equip this type of device would not allow a diagnosis at any time. This is particularly the case when an overpressure occurs in the lower engine of the vehicle. The overpressure is not a leak and the computer will be disturbed and will not be able to detect this overpressure.

The device according to the disclosed embodiments may include one or more of the following characteristics, taken in isolation from each other or in combination with each other:

the dome comprises a metal plate having said vertex substantially in its center as well as pressing legs at its periphery, there are at least two, three or four legs, the dome comprises a flexible sealing membrane, which covers said plate said terminals are connected together by at least one electrical component having a first predetermined impedance value $L_1$, a first of said terminals is located substantially below and perpendicular to said vertex, and a second of said terminals is in permanent contact with a periphery of the dome, said first terminal is connected to at least one electrical component having a second predetermined impedance value L2, said female nozzle comprises an internal chamber in which is housed a support for said dome, said support integrating electrical tracks connected to said terminals and connected to said electrical plug, said support has a general cylindrical shape, said dome being located on a circular end of said support, said components are carried by said support and for example located in a lateral recess of this support, said female nozzle comprises a fluid connection tail and a body mounted at one end of said tail, said chamber being formed in said body and being closed by a cover attached and fixed to said body, said tail has a straight or angled shape, said dome is configured to elastically deform in a direction substantially perpendicular to a direction of insertion of said male nozzle into the female nozzle, at least one annular sealing joint is mounted in said female nozzle and is located upstream of said dome with respect to the direction of insertion of said male nozzle into the female nozzle, at least one annular sealing joint is mounted in said female nozzle and is located downstream of said dome with respect to the direction of insertion of said male nozzle into the female nozzle, the device comprises fluid heating means which are housed in said female nozzle and connected to said electrical plug, the device includes said male nozzle, and said male nozzle comprises a tubular end having an outer cylindrical surface and an annular rib projecting from said surface, said rib being configured to cooperate with said snap-in means of said female nozzle, and said cylindrical surface being intended to cooperate with said dome, in particular by sliding and pressing.

DESCRIPTION OF THE DRAWINGS

The disclosed subject matter shall be better understood and other details, characteristics and advantages of the disclosed subject matter shall appear more clearly when reading the following description by way of non-limiting example and with reference to the annexed drawings in which.

DETAILED DESCRIPTION

While illustrative embodiments have been illustrated and described, it will be appreciated that various changes can be made therein without departing from the spirit and scope of the disclosure.

FIGS. 1-8 illustrate a representative embodiment of a device 10 according to the invention of fluid connection, for example between an air inlet nozzle 12 and a gas leakage pipe 14 of an internal combustion engine.

Figures 1, 2:
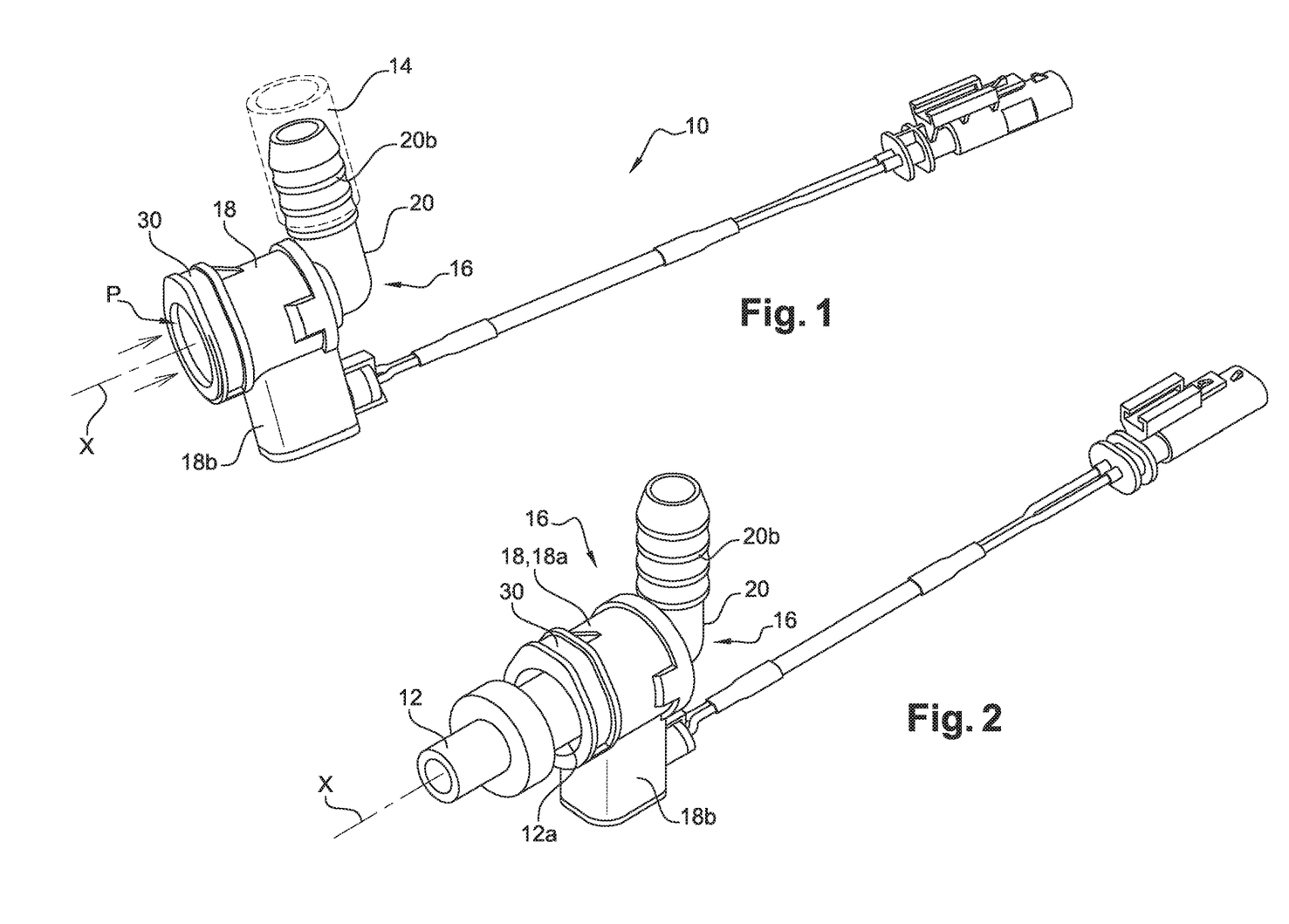
FIG. 1 is a schematic view in perspective of a representative embodiment of a fluid connection device.
FIG. 2 is a schematic view in perspective of the fluid connection device shown in FIG. 1 associated with a male nozzle.
Figure 3:
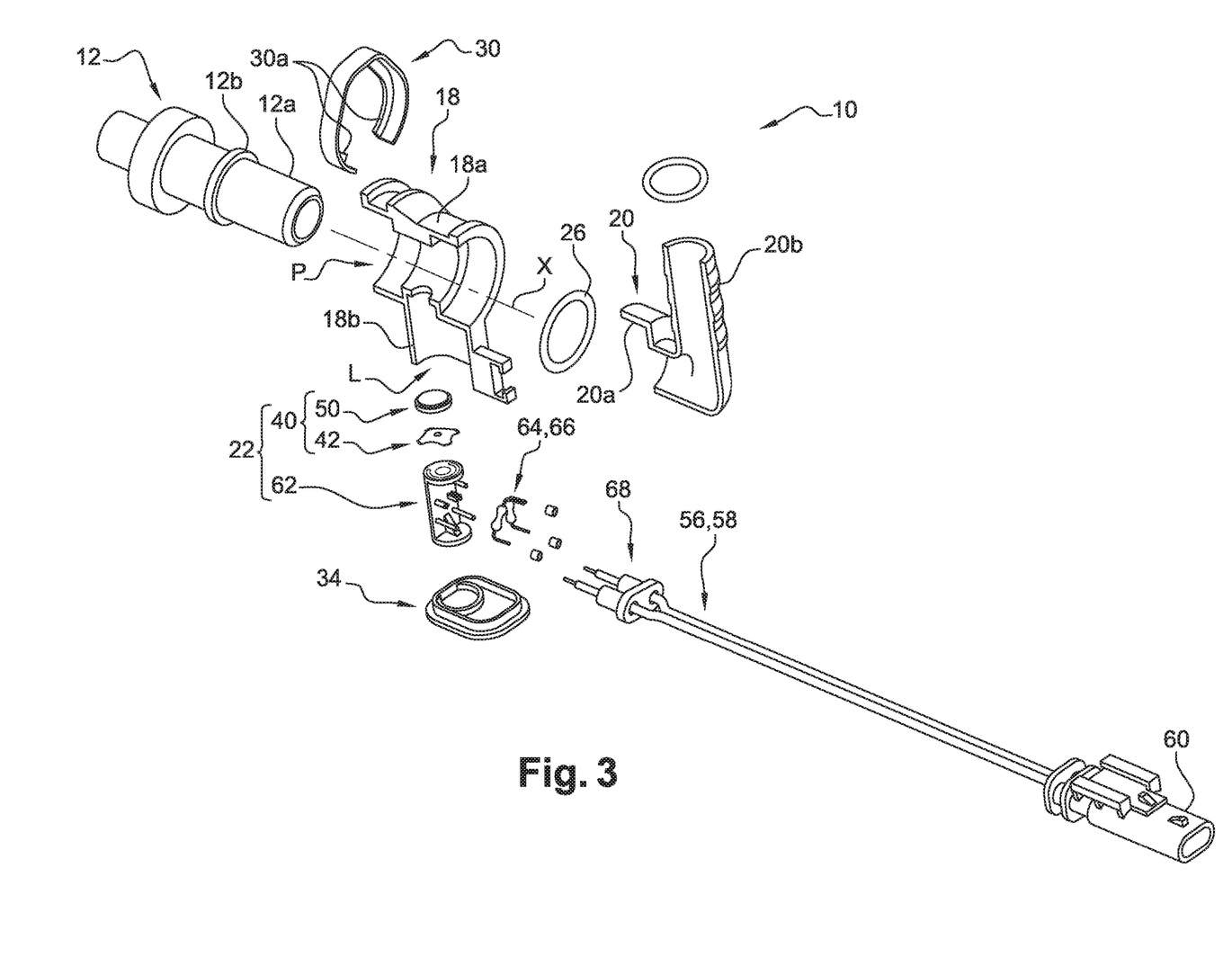
FIG. 3 is an exploded schematic view of the fluid connection device in FIG. 2.
Figures 8, 9, 10:
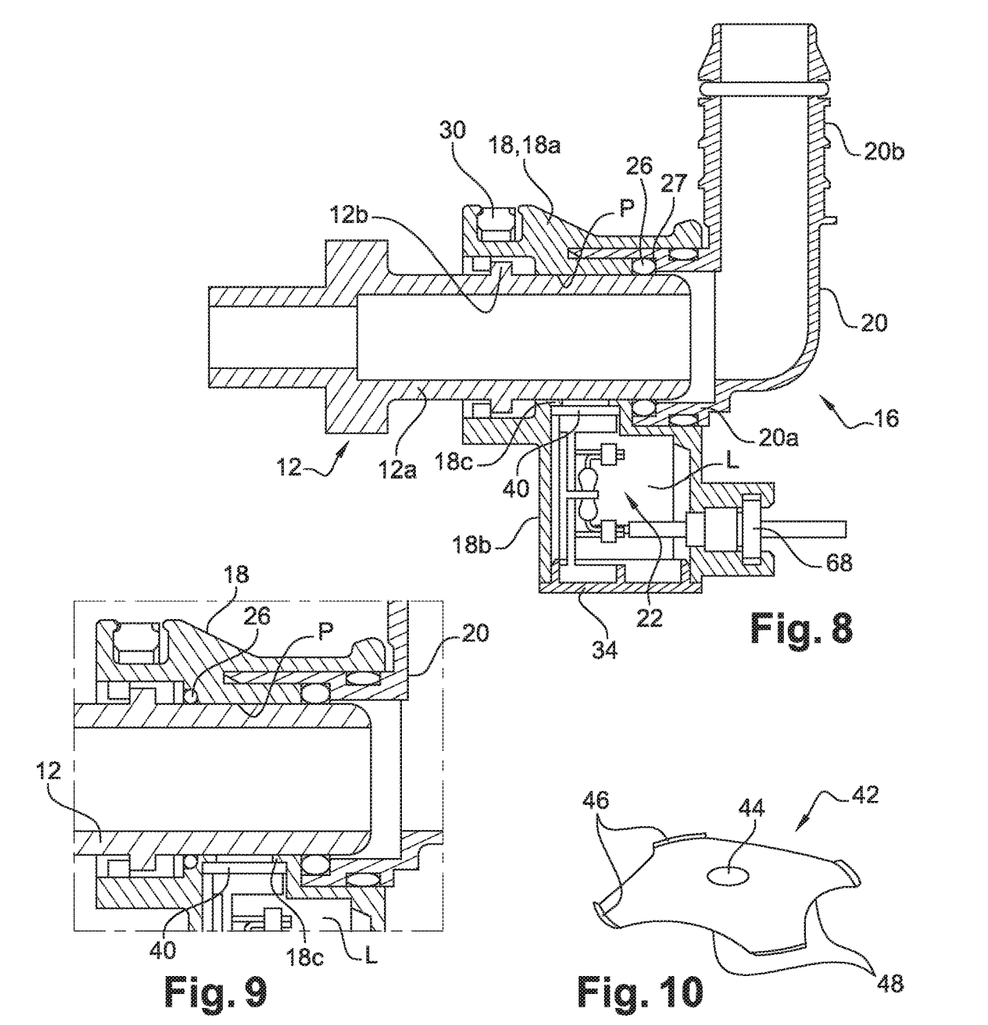
FIG. 8 is a partial schematic view in axial section of the device in FIG. 2.
FIG. 9 is a partial schematic view in axial section of a variant of embodiment of the connection device.
FIG. 10 is a schematic view in perspective of a dome of the device according to the present disclosure.

The nozzle 12 is missing from FIG. 1 and shown in FIGS. 2, 3 and 8. The pipe 14 is schematically represented by dotted lines in FIG. 1.

The device 10 has a female nozzle 16 which defines an internal passage P for fluid flow, preferably in the direction of the arrows in FIG. 1. In the example shown, the female nozzle 16 essentially consists of two parts, namely a body 18 and a connecting tail 20.

The body 18 is made of plastic, for example. It can be obtained by injection molding. The body 18 comprises two portions 18a, 18b, one of which is substantially cylindrical, the axis of rotation of which is noted X and corresponds to the axis of entry of the fluid into the body. The body 18 also includes a portion 18b that extends radially from the X axis on portion 18a. This 18b portion forms a hollow protuberance and includes an internal chamber L for receiving means 22 of detection of the connection of the nozzle 12, which is a male nozzle, in the female nozzle 16. In other words, the detection means 22 is a sensor that senses when the male nozzle 12 has been connected to the female nozzle 16.

The male nozzle 12 is generally cylindrical in shape and includes an outer cylindrical surface 12a on which at least one outer annular rib 12b protrudes. The portion 18a of the body 18 is surrounded by an elastic snap-in ring 30, i.e., an elastic retainer, which is removable here. This ring 30 is of the split type and is elastically deformable in order to increase its internal diameter. The ring 30 comprises teeth 30a oriented radially inwards (with respect to the X axis) and able to cooperate by elastic snap-fitting with the rib 12b of the nozzle. There are two teeth 30a here, diametrically opposed (FIG. 3).

The connection tail 20 has any shape and is angled in the example shown. Alternatively, it could be straight. It can be made of plastic material. The tail 20 is generally tubular in shape and comprises an end 20a mounted in one end of the internal passage P of the body 18, and in particular of the section 18a, and an opposite end 20b which has in section a firtree or similar shape to retain the pipe 14 intended to be mounted on this end 20b.

At least one annular seal joint 26 is mounted in the internal passage P of the female nozzle 16 and is configured to cooperate with the male nozzle 12. In the example shown, the seal is mounted in an internal annular groove 27 defined between the body 18 and the tail 20 (FIG. 8). The seal 26 is intended to cooperate in a sealed manner with the part of the cylindrical surface 12a of the nozzle, which extends between the rib 12b and the free end of this nozzle.

In the embodiment shown in FIG. 9, the seal 26 is mounted in the body 18 and is axially spaced from the connection tail 20.

Figure 4:
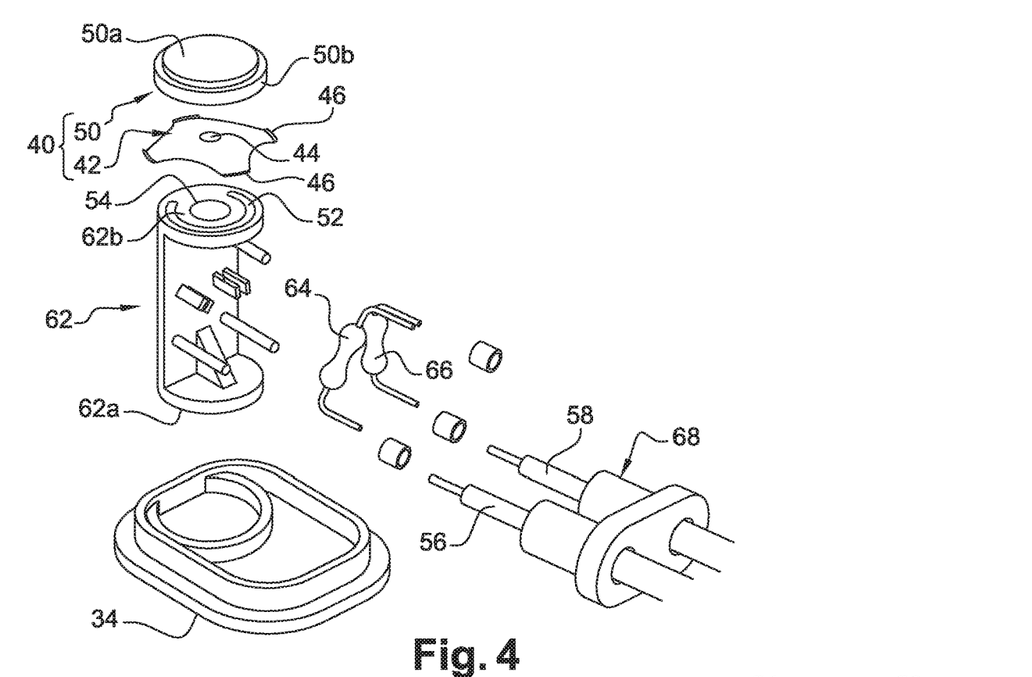
FIG. 4 is an enlarged partial view of part of FIG. 3.

The housing L of the body 18 opens radially outwards and is closed here by a cover 34 (FIGS. 3 and 4). The cover 34 is made of plastic material, for example, and is fixed to the body 18 by ultrasonic welding.

The detection means 22 located in this housing L are better visible in FIGS. 3-6.

Figure 11A:
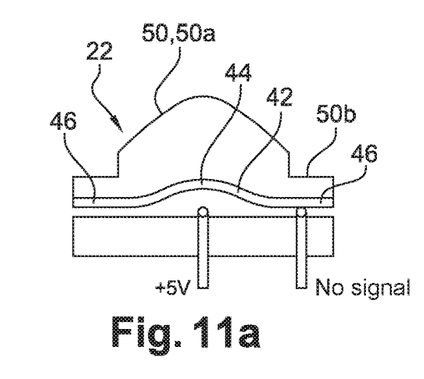
FIGS. 11a and 11b are schematic cross-sectional views of a dome, respectively in the free state without stress and in the elastically deformed state.
Figure 11B:
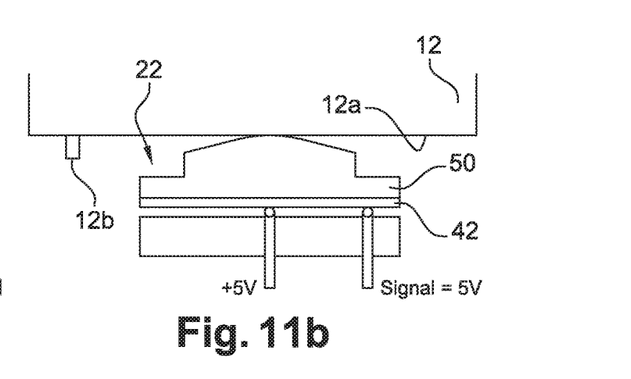

The detection means 22 shall comprise at least one flexible and electrically conductive dome 40, as schematically shown in FIG. 10. Dome 40 is elastically deformable from a free position without stress in which it has a generally curved shape (FIG. 11a), to a stressed position in which it has a generally flattened and therefore substantially flat shape (FIG. 11b).

As shown in FIG. 10, the dome 40 may include a metal plate 42 with a vertex 44 substantially in the middle and pressing legs 46 at its periphery. The plate 42 is relatively thin and has a thickness between 0.01 and 0.2 mm, and preferably between 0.04 and 0.1 mm. It is made of spring steel, for example. For example, it has a length of 2 to 10 mm and a width of 2 to 10 mm.

The purpose of the 46 legs is to ensure precise positioning and stability of the dome 40, particularly in its free position without stress. The legs 46 can be spaced from each other and connected to each other by concave curved peripheral edges 48 of the plate 42, as in the example shown. These edges 48 define air passages intended to facilitate the evacuation of air located in the space under the dome 40, during its deformation, even if the volume of this space is small considering the relatively small dimensions of the plate. The edges 48 also reduce the crushing force of the dome, the greater the removal of material from the plate and the more flexible the plate is, making switching easier. There are at least two, three or four legs 46. There are four of them in the example shown.

In addition, as shown in FIG. 10, the vertex 44 of plate 42 may include a recess so that the plate has a downwardly oriented bump and is therefore located in the space located below the plate 42. Alternatively, the vertex of the plate could include, instead of the recess, a bump, a point, a hollow, a hole, a deformation, a rounding, etc.

The dome 40 also includes a flexible sealing membrane 50, which covers the plate 42 to protect it in particular.

For example, the membrane 50 is made of rubber, preferably oil-resistant, and has a thickness of between 0.5 and 5 mm, and preferably between 0.8 and 4 mm. The membrane 50 is intended to cover the entire plate 42. It may have a general circular shape, a central portion 50a of which is curved and covers the plate 42 and in particular its vertex 44, and a peripheral portion 50b of which covers the legs 46 and is held tight against these legs by pressing against an annular flange 18c of the body 18 of the female nozzle 16.

As shown in FIG. 8, housing L opens radially inward into the inner passage P of the body 18 through an opening that is delimited by this annular flange 18c. In the mounting position of the dome 40 in the body 18, a part of the dome protrudes into the passage P when the dome is in a state without stress (FIG. 11a). The part of the dome that is located in the passage in this position can be part of the membrane 50 or even the plate 42. In a deformed and flattened position, the dome 40 is constrained outside the passage P. This is made possible by the direct cooperation of the male nozzle 12 with the dome 40.

The direction of engagement of the male nozzle 12 into the female nozzle 16 is substantially parallel to the X axis. In the example shown, the dome 40 is configured to deform elastically in a direction substantially perpendicular to this insertion direction. When engaging the male nozzle 12 in the female nozzle 16, the cylindrical surface 12a of the nozzle 12, and in particular the part of this surface extending between the rib 12b and the free end of the nozzle, is intended to cooperate by sliding and pressing on the dome 40, to constrain and deform it from the position in FIG. 11a to the position in FIG. 11b.

In the example shown in FIG. 8, the seal joint 26 is mounted in the female nozzle 16 and is located downstream of the dome 40 with respect to the insertion direction of the male nozzle 12 into the female nozzle 16. The opposite is possible in variant. In this variant shown in FIG. 9, the joint seal 26 is mounted in the female nozzle and is located upstream of the dome 40 in relation to the insertion direction of the male nozzle.

In the case of FIG. 8, the dome is isolated from the fluid and therefore less sensitive to the pressure and nature of the fluid. In the case of FIG. 9, the dome 40 is capable of detecting the nozzle 12 when the latter is sufficiently engaged and sealed in the nozzle 16. The membrane 50 is then exposed to the fluid and must be selected to have good pressure, temperature and chemical resistance, to maintain its sealing function in operation.

The dome 40, and in particular its plate 42, is made of electrically conductive material and is intended to have the function of an electrical switch. In a free position without stress, it opens an electrical circuit. In the deformed position, it closes the electrical circuit of the device 10. For this purpose, the periphery of the dome 40 is permanently pressing on a first electrical terminal 52. In the example shown, this electrical contact is provided by the legs 46 of the plate 42 which are pressing against a generally annular terminal 52 visible in FIGS. 4 to 6. The vertex 44 of the dome 40 is able to press on a second electrical terminal 54 when the dome is in a deformed state. In the example shown, this electrical contact is provided by the vertex or lower bump of the plate 42 which can be pressed against a generally circular terminal 54 visible in FIGS. 4 to 6. The annular terminal 52 extends around the circular terminal 54.

Figures 5, 6:
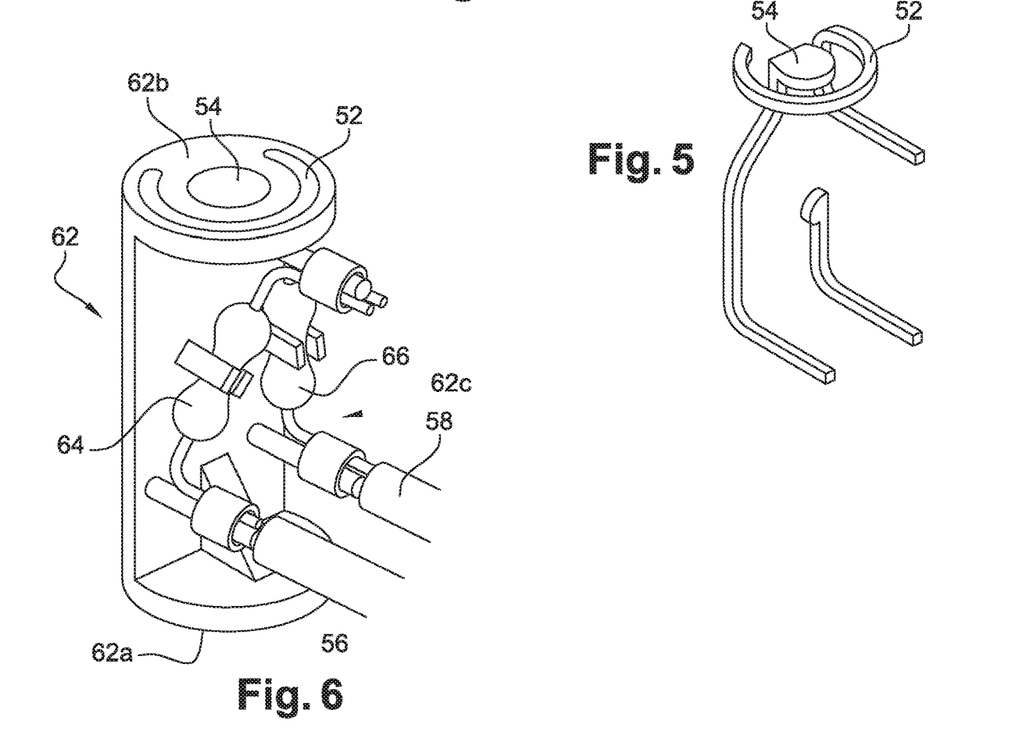
FIG. 5 is a schematic perspective view of electrical tracks of the fluid connection device shown in FIGS. 1 and 2.
FIG. 6 is a schematic perspective view of a support integrating the tracks shown in FIG. 5.

The terminals 52, 54 are connected here to tracks in the electrical circuit, which are visible in FIG. 5. The tracks allow the terminals to be electrically connected to electrical conductors 56, 58 which are themselves connected to an electrical plug 60 for electrical connection of the device 10 to an electrical power source.

The terminals 52, 54 and tracks are integrated here into a support 62 of the dome 40. The support 62 has a general cylindrical shape with an axis of revolution substantially perpendicular to the X axis. The support 62 has two circular longitudinal ends, one lower end 62a of which can be pressed and wedged on the cover 34, by shape cooperation, and the upper end 62b of which supports dome 40.

As shown in the drawings, the terminals 52, 54 are located on this upper end 62b and the dome 40 is intended to be interposed between this end and the annular flange 18c mentioned previously.

The support 62 includes a lateral recess 62c for mounting two electrical components 64, 66, which are electrical resistors in the example shown. A first electrical component 64 has a first predetermined impedance value L1 and connects the electrical terminals 52, 54 to each other. A second electrical component 66 has a second predetermined impedance value L2 and is connected to annular terminal 52. More precisely, the first component 64 connects electrical tracks connected to terminals 52, 54 to each other and is also connected to one end of one of the conductors 56 connected to the plug 60. The second component connects electrical tracks between them, one of which is connected to the first terminal 52 and the other is connected to one end of the other of the conductors 58 connected to the plug 60.

It is thus understood that support 62 integrates terminals 52, 54 and tracks and also carries components 64, 66, the whole being received in the housing L of the body 18 which is closed by the cover 34. For example, terminals 64, 66 and tracks are made from punched and folded cupronickel sheets, the support 62 being overmolded on these sheets.

The portion 18b of the female nozzle 16 includes a wall through which the conductors 56, 58 pass and which may include in this area a member 68 providing a seal between the conductors and this wall.

FIGS. 7a-7d show the electrical circuit of the device 10 in a simplified manner, with the preceding references referring to terminals 52, 54 and electrical components 64, 66.

These figures show four states that this circuit can adopt.

Figure 7A:
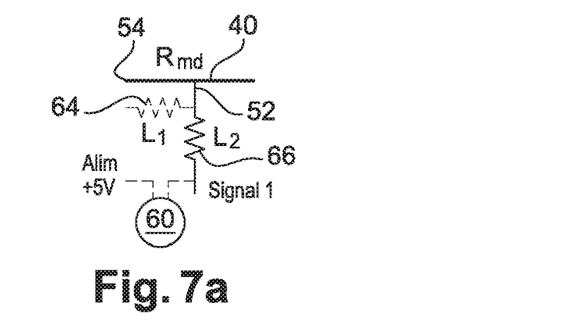
FIGS. 7a to 7d are simplified diagrams illustrating an electrical circuit of a device according to the present disclosure.
Figure 7B:
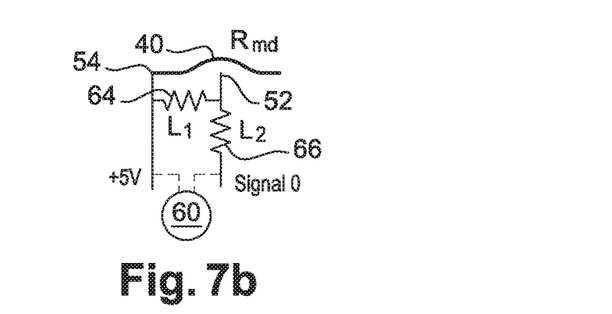
Figure 7C:
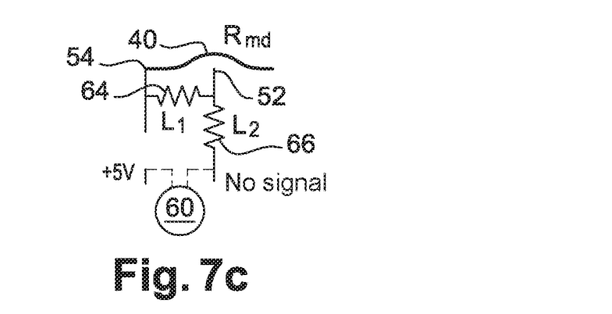
Figure 7D:
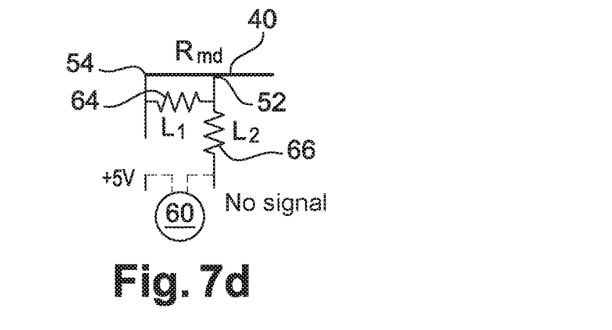

In a first state shown in FIG. 7c, the plug 60 of the device 10 is not connected to the power supply and is schematically represented by an open circuit. In a second state shown in FIG. 7b, the plug 60 of the device is connected to the power source and the dome 40 is in the free state without stress. In the third state (FIG. 7a), the dome 40 is deformed and provides the electrical connection between the terminals 52, 54. In the fourth state shown in FIG. 7d, the plug 60 is not connected and opens the circuit, while the dome 40 is deformed.

Depending on the state of the circuit, the component 64 is or is not passing, i.e. it allows current to pass through or not. In the first and last states, it does not let current pass through. In the second state, it lets current pass through but not or only slightly in the third state because the current will preferentially pass through the dome 40 of lower impedance.

In the first and last states, due to the non-connection of the plug 60 and therefore the device 10 to the power source, the circuit is completely open and the current flowing in this circuit is zero. The equivalent impedance of the circuit is infinite. In the second state, the component 64 will allow current to pass between terminals 52, 54. In the third state, the current will favor a passage through the dome 40.

The reference 60 refers to a controller or computer associated with this circuit to detect the resistance or impedance value of the circuit to determine if the nozzles 12, 16 are properly connected to each other.

The controller 60 is thus able to identify the state of the circuit. To do this, it measures the impedance value of the circuit and compares it to one or more predetermined values. When the impedance value is infinite, the circuit is in the first or last state and the device is not operational. When the impedance value is equal to the impedance value of component 64, which is for example 1.2 KΩ, the circuit is in the second state, the plug 60 is properly connected but the plug 12 is not engaged or correctly engaged in the device 10. When the measured impedance value is lower than the impedance value of the component 64 (and is, for example, a few ohms) or even zero, the circuit is in the third state, the plug 60 is properly connected and the male nozzle 12 is correctly engaged in the female nozzle 16.

The controller 60 is part of the on-board computer of the motor vehicle, for example.

Although not shown, the device 10 may include fluid heating means that are housed in the female nozzle and connected to the electrical plug. These heating means include, for example, a thermistor that is suitable for heating a thermally conductive tube extending coaxially inside the passage of the female nozzle. The thermistor can be located in the housing L.

The disclosed connector therefore makes it possible to detect the physical presence of the nozzle 12 in the body of the device 10 in order to diagnose the correct connection of this anti-pollution equipment according to the regulations in force.

The embodiments of the invention in which an exclusive property or privilege is claimed are defined as follows:

1. A fluid connection device, in particular for a motor vehicle, comprising:
   a female nozzle having an internal fluid flow passage (P), and configured to receive a male nozzle,
   an elastic retainer demountably coupled to the female nozzle and configured to engage the male nozzle when the male nozzle is received within female nozzle,
   a sensor configured to sense that the male nozzle is received within the female nozzle, and
   an electrical plug electrically connecting the sensor to an electrical power source,
   wherein the sensor comprises a flexible and electrically conductive dome disposed within the female nozzle, the dome being elastically deformable from a first position, in which the dome has a generally curved shape, and a second position, in which the male nozzle presses on a vertex of the dome to deform the dome, the dome having a generally flattened shape and providing an electrical connection between two terminals connected to the electrical plug when the dome is in the second position.

2. The device according to claim 1, wherein the female nozzle comprises a fluid connection tail and a body mounted at one end of the tail, a chamber being formed in the body and being closed by a cover attached and fixed to the body.

3. The device according to claim 1, wherein the dome is configured to elastically deform in a direction substantially perpendicular to a direction of insertion of the male nozzle into the female nozzle.

4. The device according to claim 1, wherein at least one annular sealing joint is mounted in the female nozzle and is located upstream of the dome with respect to a direction of insertion of the male nozzle into the female nozzle.

5. The device according to claim 1, wherein at least one annular sealing joint is mounted in the female nozzle and is located downstream of the dome with respect to a direction of insertion of said male nozzle into the female nozzle.

6. The device according to claim 1, wherein the male nozzle comprises a tubular end having an outer cylindrical surface and an annular rib projecting therefrom, the rib cooperating with the elastic retainer of the female nozzle, and the cylindrical surface cooperating with the dome.

7. The device according to claim 6, wherein the cylindrical surface is configured to cooperate with the dome by sliding and pressing.

8. The device according to claim 1, wherein the terminals are connected together by at least one electrical component having a first predetermined impedance value.

9. The device according to claim 8, wherein a first of said terminals is located substantially below and perpendicular to the vertex of the dome, and a second of the terminals is in permanent contact with the peripheral portion of the dome, and wherein said first terminal is connected to at least one electrical component having a second predetermined impedance value.

10. The device according to claim 9, wherein the female nozzle comprises an internal chamber in which is housed a support supporting the dome, the support integrating electrical tracks connected to the terminals and connected to the electrical plug, and wherein the components are carried by the support.

11. The device according to claim 10, wherein the components are located in a lateral recess of the support.

12. A fluid connection device, in particular for a motor vehicle, comprising:
a female nozzle having an internal fluid flow passage (P), and configured to receive a male nozzle,
an elastic retainer demountably coupled to the female nozzle and configured to engage the male nozzle when the male nozzle is received within female nozzle,
a sensor configured to sense that the male nozzle is received within the female nozzle, and
an electrical plug electrically connecting the sensor to an electrical power source,
wherein the sensor comprises a flexible and electrically conductive dome disposed within the female nozzle, the dome being elastically deformable from a first position, in which the dome has a generally curved shape, and a second position, in which the male nozzle presses on a vertex of the dome to deform the dome, the dome having a generally flattened shape and providing an electrical connection between two terminals connected to the electrical plug when the dome is in the second position, wherein a first of the terminals is located substantially below and perpendicular to the vertex of the dome, and a second of the terminals is in permanent contact with the peripheral portion of the dome.

13. A fluid connection device, in particular for a motor vehicle, comprising:
a female nozzle having an internal fluid flow passage (P), and configured to receive a male nozzle,
an elastic retainer demountably coupled to the female nozzle and configured to engage the male nozzle when the male nozzle is received within female nozzle,
a sensor configured to sense that the male nozzle is received within the female nozzle, and
an electrical plug electrically connecting the sensor to an electrical power source,
wherein the sensor comprises a flexible and electrically conductive dome disposed within the female nozzle, the dome being elastically deformable from a first position, in which the dome has a generally curved shape, and a second position, in which the male nozzle presses on a vertex of the dome to deform the dome, the dome having a generally flattened shape and providing an electrical connection between two terminals connected to the electrical plug when the dome is in the second position, further comprising a heater housed in the female nozzle and connected to the electrical plug.

14. A fluid connection device, in particular for a motor vehicle, comprising:
a female nozzle having an internal fluid flow passage (P), and configured to receive a male nozzle,
an elastic retainer demountably coupled to the female nozzle and configured to engage the male nozzle when the male nozzle is received within female nozzle,
a sensor configured to sense that the male nozzle is received within the female nozzle, and
an electrical plug electrically connecting the sensor to an electrical power source,
wherein the sensor comprises a flexible and electrically conductive dome disposed within the female nozzle, the dome being elastically deformable from a first position, in which the dome has a generally curved shape, and a second position, in which the male nozzle presses on a vertex of the dome to deform the dome, the dome having a generally flattened shape and providing an electrical connection between two terminals connected to the electrical plug when the dome is in the second position, wherein the female nozzle comprises an internal chamber in which is housed a support supporting the dome, the support integrating electrical tracks connected to the terminals and connected to the electrical plug.

15. The device according to claim 14, wherein the support has a generally cylindrical shape, the dome being located on a circular end of the support.

16. A fluid connection device, in particular for a motor vehicle, comprising:
a female nozzle having an internal fluid flow passage (P), and configured to receive a male nozzle,
an elastic retainer demountably coupled to the female nozzle and configured to engage the male nozzle when the male nozzle is received within female nozzle,
a sensor configured to sense that the male nozzle is received within the female nozzle, and
an electrical plug electrically connecting the sensor to an electrical power source,
wherein the sensor comprises a flexible and electrically conductive dome disposed within the female nozzle, the dome being elastically deformable from a first position, in which the dome has a generally curved shape, and a second position, in which the male nozzle presses on a vertex of the dome to deform the dome, the dome having a generally flattened shape and providing an electrical connection between two terminals connected to the electrical plug when the dome is in the second position, wherein the dome comprises a metal plate having the vertex located in a center portion and at least one support leg located at a peripheral portion.

17. The device according to claim 16, wherein the metal plate has at least two support legs.

18. The device according to claim 16, wherein the dome comprises a flexible sealing membrane covering the plate.

* * * * *